United States Patent
Dinges et al.

(10) Patent No.: US 7,359,957 B2
(45) Date of Patent: Apr. 15, 2008

(54) METHOD FOR ACCESSING INFORMATION AND/OR SERVICES OF A DISTRIBUTED AUTOMATION SYSTEM

(75) Inventors: Clemens Dinges, Obermichelbach (DE); Michael Schlereth, Wilhermsdorf (DE)

(73) Assignee: Siemens Aktiengesellschaft, Munich (DE)

(*) Notice: Subject to any disclaimer, the term of this patent is extended or adjusted under 35 U.S.C. 154(b) by 595 days.

(21) Appl. No.: 10/489,469

(22) PCT Filed: Sep. 14, 2002

(86) PCT No.: PCT/DE02/03499

§ 371 (c)(1),
(2), (4) Date: Mar. 10, 2004

(87) PCT Pub. No.: WO03/029905

PCT Pub. Date: Apr. 10, 2003

(65) Prior Publication Data

US 2004/0243689 A1    Dec. 2, 2004

(30) Foreign Application Priority Data

Sep. 27, 2001    (EP)    .................................. 01123168
Dec. 6, 2001    (DE)    ................................. 101 59 931

(51) Int. Cl.
G06F 15/16        (2006.01)

(52) U.S. Cl. ...................... 709/219; 709/217; 709/218; 709/219

(58) Field of Classification Search ......... 709/217–219
See application file for complete search history.

(56) References Cited

U.S. PATENT DOCUMENTS

| | | | |
|---|---|---|---|
| 6,421,733 B1* | 7/2002 | Tso et al. | 709/246 |
| 6,480,881 B1* | 11/2002 | Kubota et al. | 709/202 |
| 6,529,996 B1* | 3/2003 | Nguyen et al. | 711/114 |
| 6,895,588 B1* | 5/2005 | Ruberg | 719/321 |
| 7,080,051 B1* | 7/2006 | Crawford | 705/400 |
| 7,165,109 B2* | 1/2007 | Chiloyan et al. | 709/227 |
| 2002/0069100 A1* | 6/2002 | Aberman | 705/10 |
| 2002/0147973 A1* | 10/2002 | Fordemwalt et al. | 717/174 |
| 2002/0152279 A1* | 10/2002 | Sollenberger et al. | 709/217 |
| 2002/0156917 A1* | 10/2002 | Nye | 709/238 |
| 2003/0028625 A1* | 2/2003 | Sanjeev et al. | 709/220 |
| 2003/0065755 A1* | 4/2003 | Gunji | 709/221 |
| 2003/0226138 A1* | 12/2003 | Luu | 717/175 |
| 2005/0187942 A1* | 8/2005 | Dutta et al. | 707/10 |
| 2006/0149806 A1* | 7/2006 | Scott et al. | 709/201 |
| 2006/0195550 A1* | 8/2006 | Craik | 709/217 |
| 2007/0016309 A1* | 1/2007 | McKelvey et al. | 700/9 |

FOREIGN PATENT DOCUMENTS

| | | | |
|---|---|---|---|
| WO | WO 01/35178 A1 | 5/2001 | |
| WO | WO 01/46763 A2 | 6/2001 | |

* cited by examiner

*Primary Examiner*—Nathan Flynn
*Assistant Examiner*—Mohamed Wasel

(57) ABSTRACT

The invention relates to a method for accessing information and/or services of a distributed automation system comprising a plurality of automation devices, by means of one of the automation devices. According to said method, information concerning an automation device to be serviced constitutes a selection criterion, which can be used to automatically search for information and/or services for servicing the automation device to be served.

7 Claims, 1 Drawing Sheet

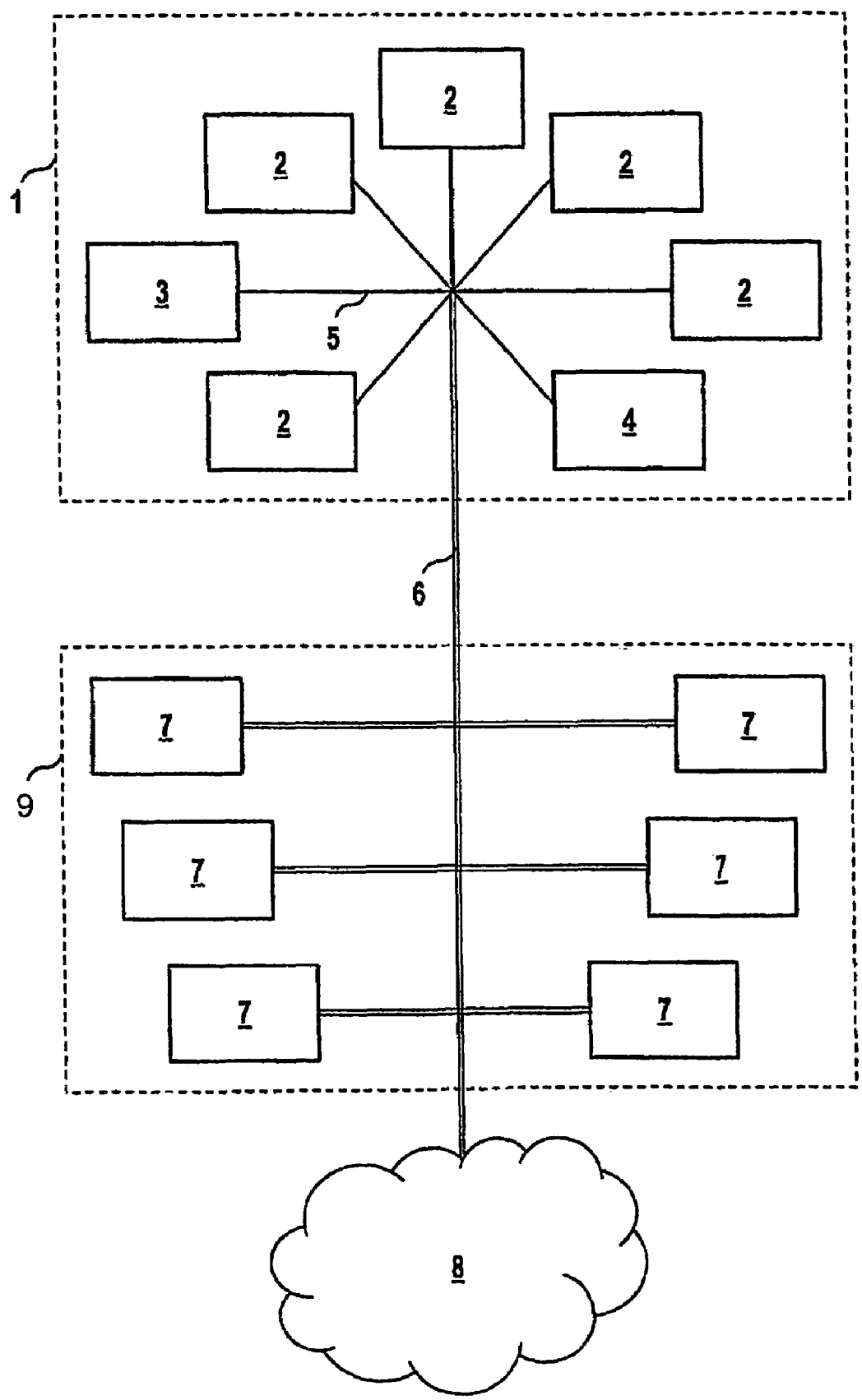

METHOD FOR ACCESSING INFORMATION AND/OR SERVICES OF A DISTRIBUTED AUTOMATION SYSTEM

CROSS REFERENCE TO RELATED APPLICATIONS

This application is the US National Stage of International Application No. PCT/DE02/03499, filed Sep. 17, 2002 and claims the benefit thereof. The International Application claims the benefits of European application No. 01123168.5 filed Sep. 27, 2001, and of German application No. 10159931.5 filed Dec. 6, 2001, all of the applications are incorporated by reference herein in their entirety.

FIELD OF INVENTION

The invention relates to a method for accessing information and/or services of a distributed automation system comprising a plurality of automation devices, by means of one of the automation devices.

BACKGROUND OF INVENTION

Access is carried out here within a network of automation devices, wherein each automation device is a communication user within the network and wherein a peer-to-peer connection exists at least at times between two automation devices in each case. In a network which enables peer-to-peer communication, all communication users are given a facility for equality of access to the network. Each communication user can offer information and services to other communication users and, for its part, use information and services offered by other communication users. In addition, the facility is also offered for searching for and pinpointing the location of information and services on other communication users and then accessing these functions or services.

In the Internet, portals are known. A portal offers special access to information and services in that it is possible to request the communication users and, in relation to the communication user, the memory location at which the information or service is filed, and a peer-to-peer connection can be established with said communication user by means of a simple action. The information can be fetched or the service utilized via such a peer-to-peer connection.

From the earlier (§3(2)(2) Patent Act and §54(3) European Patent Convention) European patent application with the filing No. 001123168.5 a method for dynamically accessing automation resources is known, wherein in a distributed automation system with a number of automation components a first automation component, which is searching for an automation resource, addresses an inquiry to the automation system and receives from all accessible automation components a response to this inquiry regarding suitable available automation resources and then selects the particular automation component with the appropriate automation resource and uses the automation resource.

SUMMARY OF INVENTION

The object of the invention is to indicate a method by means of which information or services can be searched for simply and efficiently.

This object is achieved according to the invention in the features of claim 1. To this end, in a method for accessing information and/or services of an automation system wherein the automation system comprises a plurality of automation devices and the services and/or information are accessed by means of one of the automation devices, it is provided that information concerning an automation device to be serviced constitutes a selection criterion which can be used to search automatically for information and/or services for servicing the automation device to be serviced.

The invention proceeds from the recognition that information or services which an automation device needs are frequently already present in the automation system, e.g. in other identical or similar automation devices.

The advantage of the invention lies in the fact that it is no longer necessary for a service engineer who is called to the automation system, for example to service an automation device, to have to carry with him/her all the data and software applications which may be required. Instead, he/she can search for the information or service specifically required in each case and, after a successful search, access said information or service.

The subclaims relate to advantageous embodiments of the invention.

If the automation system comprises a programming device as an automation device, and the search is carried out in stages, initially in the programming device and then in the automation system, i.e. in all other automation devices interconnected in the automation system, a particularly favorable search strategy is pursued. It is assumed here that a plurality of data and software applications is stored on a programming device which normally comprises a storage medium such as a fixed disk. Thus, the probability that the required information or services are held on the programming device is particularly high. In addition, the speed of the search is increased if the search is started on the device in respect of which the greatest probability exists that the information is available.

If the search on the programming device and in the automation system is unsuccessful, it is extended in a further step to a company wide network. The company-wide network becomes—from the viewpoint of the programming device—to all intents and purposes an integral part of the automation system. The advantage lies in the fact that the company-wide network of the company to which the service engineer belongs can be accessed, and access thus also exists to data and applications which the service engineer does not have direct access to, either because they have been forgotten or because it could not have been foreseen at the commencement of the deployment of the service engineer that they would be needed in the course of the deployment, or because the service engineer has, due to limited storage resources, no facility for carrying with him/her certain data or applications on the programming device.

If the search is unsuccessful on the programming device and in the automation system and in the company-wide network, said search is in a final step extended to the Internet. The Internet becomes in this case—from the viewpoint of the programming device—to all intents and purposes an integral part of the automation system. Today, the Internet already provides such a wealth of information and services for retrieval that it appears justified to conclude that virtually any requestable information or service is available on the Internet. Since the information or services which may be relevant for operating an automation system limit the range of information or services, it can be assumed that the search will, at latest on the Internet, be successful, because via the Internet access can also be gained e.g. to competing companies' information or services.

In the search, the selection criterion by means of which the information or services to be searched for are specified, is advantageously extended to include a desired cost model in accordance with which the information or services can be retrieved or used. If a first service provider or information provider—especially on the Internet—provides for a charge per use or per time unit or if use is possible only after prior notification, the required information or service can be selected directly by means of a selection criterion appropriately extended in this regard.

Advantageously, the selection criterion can alternatively or additionally also be extended to include information provider or service provider references. It is thereby possible to search for services and information preferably among those providers whose services have already been used more frequently or whose service was last used. It is also conceivable to search in this way for services and information preferably among new providers or among providers already active for a relatively long period of time, for example.

Advantageously, the selection criterion can alternatively or additionally also be extended to include minimum requirements with regard to the quality of the communication link. The result of this is that a service or information that has been found can be used particularly quickly, for example because the quality of the link complies with certain standards and any repetition of transfer processes to eliminate errors is thus seldom necessary or because the bandwidth of the link complies with certain standards and the transfer process can thus be dealt with particularly quickly.

The information and/or services are advantageously accessed by means of a portal, in particular by means of a self-configuring portal. The information or service sought is requested from the portal of the communication user at which it is held available. The information or service is then transmitted from the portal to the originally requesting communication user or the service is executed directly at the portal. The portal is itself a communication user in the network. The portal can run as a software application on the programming device.

Service engineers are often called to different automation systems. When faults are analyzed, similar search processes are often needed on the different automation systems, but, because of the differing topologies of the automation systems, these search processes cannot be predefined in the form of web catalogs, indexes of search engines or other access structures with fixed address information. In order to automate such access, generic, i.e. user- and system-independent, search inquiries based on peer-to-peer search mechanisms are stored in the portal, which mechanisms can, as required, be started up by the service engineer and thus dynamically generate current result lists at any time. An example of access by means of a predefined search inquiry is the generation of a list of the engineering tools which are needed for the individual components of the respective automation system and/or available in the automation system. Such lists can be integrated, e.g. in a tree structure of a catalog. The user can, as required, define and store additional search inquiries of the type described above and supplement and modify the catalog with the results returned in each case.

BRIEF DESCRIPTION OF THE DRAWINGS

An embodiment of the invention is described in detail below with reference to the drawing. Items or elements corresponding to one another are assigned the same reference characters in all the Figures.

In the drawing, the single FIGURE shows communication users communicatively linked to one another in a network.

DETAILED DESCRIPTION OF INVENTION

FIG. 1 shows an automation system 1 comprising a plurality of automation devices 2, 3, 4 which are connected to one another communicatively via an automation system bus 5, e.g. a field bus 5. One of the automation devices 3 is a programming device 3 which is temporarily connected to the automation system bus 5 for servicing an automation device 4 to be serviced.

A communications link 6 exists between the automation system 1 and a company-wide network 9. Via this link 6, access to information and/or services which are held available by one of the communication users 7 of the company-wide network 9 is possible for automation devices 2, 3 and 4. The company-wide network is in this case e.g. the network 9 of the company which is entrusted with servicing the automation system 1. The company-wide network 9 can, for example, also be the network 9 of the company which manufactures or distributes the automation devices 2, 3, 4, in particular the automation device 4 to be serviced.

Finally, the connection 6 also provides a connection to the Internet 8. On the Internet 8, it is possible to access further information and service resources.

In the case of the servicing of the automation device 4 to be serviced, a special automation device 3 by means of which servicing jobs can be carried out, e.g. a programming device 3, is connected to the automation system bus 5. Via the bus 5 a connection, in particular a peer-to-peer connection, can be established between the programming device 3 and the automation device 4 to be serviced. Via this connection, status information is obtained from the automation device 4 to be serviced. This status information may be e.g. a fault report or a request regarding certain information, e.g. regarding a foreign-language version of an operating handbook. The fault report is in this case either directly analyzable or implicit, e.g. contained in the totality of states of the automation device if, based on the states, a specific fault condition can automatically be concluded. The status information constitutes a selection criterion which can be used to search automatically, initially on the programming device 3, for information and/or services for servicing the automation device 4 to be serviced.

If the information or service sought is available on the programming device 3, the requested information is transmitted to the automation device 4 and/or the service requested is executed either on the programming device or, after the requested service has been transmitted to the automation device 3, on the automation device.

If the information or service sought is not available on the programming device 3, the search is extended, where a connection 6 exists to a company-wide network 9, to the network 9. If the information or services are found on one of the communication users 7 of the company-wide network 9, they are—as if they had been found on the programming device 3—transmitted or executed.

If the information or services sought are also not available in the company-wide network 9, the search is, where a connection 6 to the Internet 8 exists, finally continued on the Internet 8.

The invention can thus be briefly described as follows:

A method is indicated for accessing information and/or services of a distributed automation system 1 comprising a plurality of automation devices 2, 3, 4, by means of one of the automation devices 3, wherein information concerning an automation device 4 to be serviced constitutes a selection criterion which can be used to search automatically for information and/or services for servicing the automation device 4 to be serviced.

The invention claimed is:

1. A method for accessing information and/or services of an automation system comprising:
   providing a plurality of automation devices on a field bus;
   connecting a servicing device to the field bus;
   establishing a communication on the field bus between the servicing device and one of the automation devices;
   retrieving status information from said one of the automation devices into the servicing device via the communication;
   preparing a selection criterion in the servicing device from the retrieved status information;
   and automatically searching by means of the servicing device for information and/or services for servicing said one of the automation devices, using the selection criterion, by searching first in the servicing device, and if not found in the servicing device, searching next among the automation devices on the field bus, and if not found among the automation devices on the field bus, searching next among communications users in a given company network external to the field bus, and if not found in the company network, searching the Internet.

2. The method according to claim 1, wherein the selection criterion comprises a cost model in accordance with which the information or services can be retrieved or used.

3. The method according to claim 1, wherein the selection criterion includes information provider or service provider references.

4. The method according to claim 1, wherein the selection criterion comprises minimum requirements with regard to the quality of the communication link.

5. The method according to claim 1, wherein access to the information and/or services is provided by a portal.

6. The method according to claim 5, wherein the portal is a self-configuring portal.

7. A method for accessing information/or services of an automation system comprising:
   providing a plurality of automation devices interconnected by a field bus;
   connecting a servicing device to the field bus, the servicing device comprising a data storage medium;
   retrieving status information from a given one of the automation devices over the field bus into the servicing device;
   determining a fault or a service requirement of said one of the automation devices from the retrieved status information;
   preparing a search criterion in the servicing device from the retrieved status information and the fault or the service requirement;
   automatically conducting by means of the servicing device, using the search criterion, a first search on the storage device for a software application to resolve the fault or the service requirement;
   if the first search is unsuccessful, next automatically conducting by means of the servicing device a second search via the field bus for the software application among the plurality of automation devices;
   if the second search is unsuccessful, next automatically conducting by means of the servicing device a third search via a communications link for the software application among communication users of a given company on a network external to the automation system; and
   if the third search is unsuccessful, next automatically conducting by means of the servicing device a fourth search via the Internet for the software application, the fourth search comprising results prioritized by previously accepted Internet sites, cost, and connection speed.

* * * * *